United States Patent [19]

Glitho

[11] Patent Number: 5,544,154
[45] Date of Patent: Aug. 6, 1996

[54] METHOD FOR DETERMINING THE LOAD INDUCED BY A ROUTING VERIFICATION TEST ON A NETWORK

[75] Inventor: Roch Glitho, Montreal, Canada

[73] Assignee: Telefonaktiebolaget LM Ericsson, Stockholm, Sweden

[21] Appl. No.: 401,161

[22] Filed: Mar. 9, 1995

[51] Int. Cl.$^6$ .................................... H04L 12/26
[52] U.S. Cl. ................................ 370/17; 370/60
[58] Field of Search ................. 370/13, 14, 15, 370/16, 17, 60, 54, 94.3, 94.1, 110.1; 371/30, 33; 379/229, 230, 231

[56] References Cited

U.S. PATENT DOCUMENTS

| | | | |
|---|---|---|---|
| 4,486,877 | 12/1984 | Turner | 370/15 |
| 4,670,871 | 6/1987 | Vaidya | 370/60 |
| 4,696,000 | 9/1987 | Payne, III | 370/60 |
| 4,745,593 | 5/1988 | Stewart | 370/15 |
| 5,115,495 | 5/1992 | Tsuchiya et al. | 370/94.1 |
| 5,216,591 | 6/1993 | Nemirovsky et al. | 370/16 |
| 5,233,607 | 8/1993 | Barwig et al. | 370/94.1 |
| 5,241,533 | 8/1993 | Kimoto et al. | 370/16 |
| 5,243,592 | 9/1993 | Perlman et al. | 370/17 |
| 5,274,643 | 12/1993 | Fisk | 370/60 |

OTHER PUBLICATIONS

CCITT Draft Recommendation Q. 751 "Signalling System No. 7—Managed Objects", Geneva, 1993, pp. 1–10.
CCITT Recommendation Q. 753 "Signalling System 7 Management Functions MRVT, SRVT, CVT and Definition of Omase-User", Geneva, 1992, pp. 1–12.
Bellcore "CCS Node Requirements to Support Routing Verification Tests", Nov. 1993.

*Primary Examiner*—Benedict V. Safourek
*Assistant Examiner*—Chau T. Nguyen
*Attorney, Agent, or Firm*—Smith & Catlett, P.C.

[57] ABSTRACT

There is disclosed a method for determining the load to be induced on a network by running a routing verification test on the network. The method involves utilizing the telecommunications management network to sample through a general purpose management interface routing table information at live nodes in the operating network. The telecommunications management network subsequently determines the message tree between an operator selected source node and destination node and determines from this tree the number of transmitted, acknowledged and received messages that would be generated by conducting a routing verification test on the network. This method has the advantage that the operator is informed before running a verification test of the load that test will induce on the network. Thus the operator can run the test at his discretion to ensure that overload conditions are not experienced by running the test.

17 Claims, 5 Drawing Sheets

FIG. 2

| NODE | PRIMARY LINK SET | ALTERNATIVE LINK SETS |
|---|---|---|
| START | 27 | 28, 26 |
| STP1 | 32 | 34 |
| STP2 | 40 | 30 |
| STP3 | 42 | 36 |
| STP4 | 38 | NO ENTRY |

METHOD FOR DETERMINING THE LOAD INDUCED BY A ROUTING VERIFICATION TEST ON A NETWORK

FIELD OF THE INVENTION

The present invention relates to a method for auditing routing table information in a packet switching network. In particular, it relates to a method of determining the traffic message load induced by a test of the correctness of routing table information associated with respective switching nodes or signalling points and signalling transfer points of Signaling Systems No. 7 (SS7) networks.

BACKGROUND OF THE INVENTION

Routing of messages from a source node to a destination node in networks, such as for example packet switched networks (PSN's), is performed automatically by the use of routing tables. A routing table is located at each node of the network and contains information as to the link set between nodes that the message is to be transmitted. This information usually includes a preferred or normal route and one or more secondary or failure routes.

Signaling System No. 7 (SS7) interconnects stored program control exchanges, network data bases and intelligent peripherals of telecommunications management networks. SS7 is used to exchange messages and information respectively related to call management and to distributed applications and network management. The protocols of SS7 have been standardized by the "Comite Consultatif International pour le Telephone et le Telegraphe" (CCITT) which is known today as the International Telecommunications Union—Telecommunications Standardization Sector (ITU-T).

To operate properly, the correct routing table information is loaded and stored in each table at system start-up or generation. This information is constant and the routing table is described as "static". The routing tables may also be described as "partial path" because the information stored in each table relates only to the next node on the way to the destination. The integrity of the routing information stored in the tables is fundamental to the normal functioning of the network.

Network communication problems arise when the routing information in tables is incorrect or becomes corrupted. One example of a problem is when the table fails to contain an entry for a destination node causing the message to stop at that node and to fail to make it to its destination. Another problem example occurs when tables at two or more nodes contain destination information directed to each other resulting in the message traveling in an endless loop. A third message transmission problem occurs when the message tree between the source node and the destination node results in an excessive length route where the message crosses more STP's than the maximum allowed STP's in the network. Still yet another problem occurs when the signal path through the network is unidirectional. That is to say the message can travel in one direction through the tree from the source node to the destination node but it cannot travel in the reverse direction from the destination node to the source node.

In SS7 networks there are currently two methods used to check the correctness of SS7 routing tables.

The first method involves checking "off-line" the correctness of the routing data before the introduction of this data to the tables. Various simulation methods are used for to check the information. The problem with this method resides in errors introduced during the manual data entry of the information in the table for each node by the operational staff. Further, data corruption can occur after entry. This "off-line" method of testing table data information does not safe-guard against errors occurring during loading of the data in the tables or against errors due to data corruption.

The second method used to check the correctness of SS7 routing tables is a real time check of the table routing data in the network. It consists of auditing "on-line" during network operation the routing data after it has been introduced in the tables. There are two standardized "on-line" tests in use today to check the correctness of SS7 routing data. These tests are known as the Message Transfer Part (MTP) Routing Verification Test (MRVT) and the Signalling Connection Control Part (SCCP) Routing Verification Test (SRVT). The MRVT and the SRVT check respectively the content of the Message Transfer Part (MTP) routing tables and the content of the SCCP routing tables. These tests when initiated at a given source node to test a given destination node will follow all possible routes. This is done by sending multiple test messages and tracking the identities of all nodes crossed by the message. Information on the success of this testing is transmitted back to the destination node. An example of an "on-line" testing procedure is disclosed in U.S. Pat. No. 4,745,593 issued May 17, 1988 to Gilbert M. Stewart.

One problem associated with this routing verification test is the extra network loading associated with the testing. The networks are already operating under time restraints to deliver messages between source nodes and destination nodes. The introduction of the "on-line" testing to be thorough should be conducted on several nodes over a predetermined time interval. For example, if a network has 20 nodes, there could be hundreds of possible test routes to follow in one test. This one test could significantly load the network. SS7 networks are signalling networks with very stringent delay objectives that the networks can hardly meet when they are overloaded. Consequently, operators are reluctant to perform tests of routing tables in networks.

In the published paper by Bellcore entitled "CCS node requirements to support routing verification tests", TANWT-001245, November 1993 there is a discussion on determining the extra load induced on a SS7 network by the messages generated by the MRVT and the SRVT testing. This document teaches calculating the amount of messages generated by an MRVT test or an SRVT test before the test is actually run. The document stipulates that when a routing verification test is initiated between a source node and a destination node, the amount of messages received by the destination node is equal to 2 to the power 2n, where n is the number of mated Signalling Transfer Points (STP) pairs between the source node and the destination node. The formula has two serious limitations. First, it assumes that the network has a regular topology, each node being connected to only one pair of STP, the homing STP pair. But most "real life" networks have irregular topologies. Besides the connection to the mated STP, the source node can also have a direct connection to the destination node. Such a direct connection is known as an F-link. Second, this formula allows the calculation of the amount of messages received by the source node. But it does not allow the calculation of the total amount of messages generated during the test because the messages received by intermediate nodes are not counted.

In view of the foregoing, it can be appreciated that there is a problem with routing table information and the verification of that information particularly after the table information has been loaded into the network. There does not appear to be a solution available to the operator to accurately determine the impact a verification routing test will have on the network prior to running the verification testing.

SUMMARY OF THE INVENTION

In accordance with an aspect of the present invention there is provided a method for determining the "on line" load induced by a routing verification test on a packet switching network. The network comprises a plurality of packet switching nodes and a plurality of bi-directional links each interconnecting a distinct pair of said nodes. The packet switching network having associated therewith a telecommunications management network comprising an operation system connected to each of said nodes through respective interfacing links. The method comprises the steps of: collecting live routing data of link sets between nodes for sampled nodes in the switching network; transferring collected routing data from each of the sampled nodes through the respective interfacing link to the operation system; generating a message tree corresponding to the collected routing data in the operation system between an operator defined source node to an operator defined destination node through all intermediate nodes to determine the total number of messages transmitted, acknowledged and received between the defined source and destinations nodes; and, generating a signal to the operator representative of the total number of messages induced on the network.

The present invention allows an operater to determine the number of messages a routing verification test will generate, without running an on-line test or simulating an off-line test. This allows the operator the opportunity to estimate the extra load generated when routing verification tests are run in live networks. It will thus allow for a proper scheduling of those tests.

In accordance with another aspect of the present invention there is provided a system for determining the "on line" load induced by a routing verification test on a packet switching network. The network comprises a plurality of packet switching nodes and a plurality of bi-directional links each interconnecting a distinct pair of said nodes. The packet switching network has associated therewith a telecommunications management network. The system includes an operation system functioning independently and remotely of the packet switching network and forming part of the telecommunications management network. The system also includes interfacing links connected between the operation system and respective ones of the switching nodes for sampling routing table data information at that node. The operation system collects live routing data of link sets between nodes for sampled nodes in the switching network; transfers collected routing data from each of the sampled nodes through the respective interfacing link to the operation system; generates a message tree corresponding to the collected routing data in the operation system between an operator defined source node to an operator defined destination node through all intermediate nodes to determine the total number of messages transmitted, acknowledged and received between the defined source and destinations nodes; and, generates a signal to the operator representative of the total number of messages induced on the network.

BRIEF DESCRIPTION OF THE DRAWINGS

For a better understanding Of the nature and objects of the present invention reference may be had to the accompanying diagrammatic drawings in which:

FIG. 2 illustrates a correct routing table for the switching network of FIG. 1;

DETAILED DESCRIPTION

Figure 1:
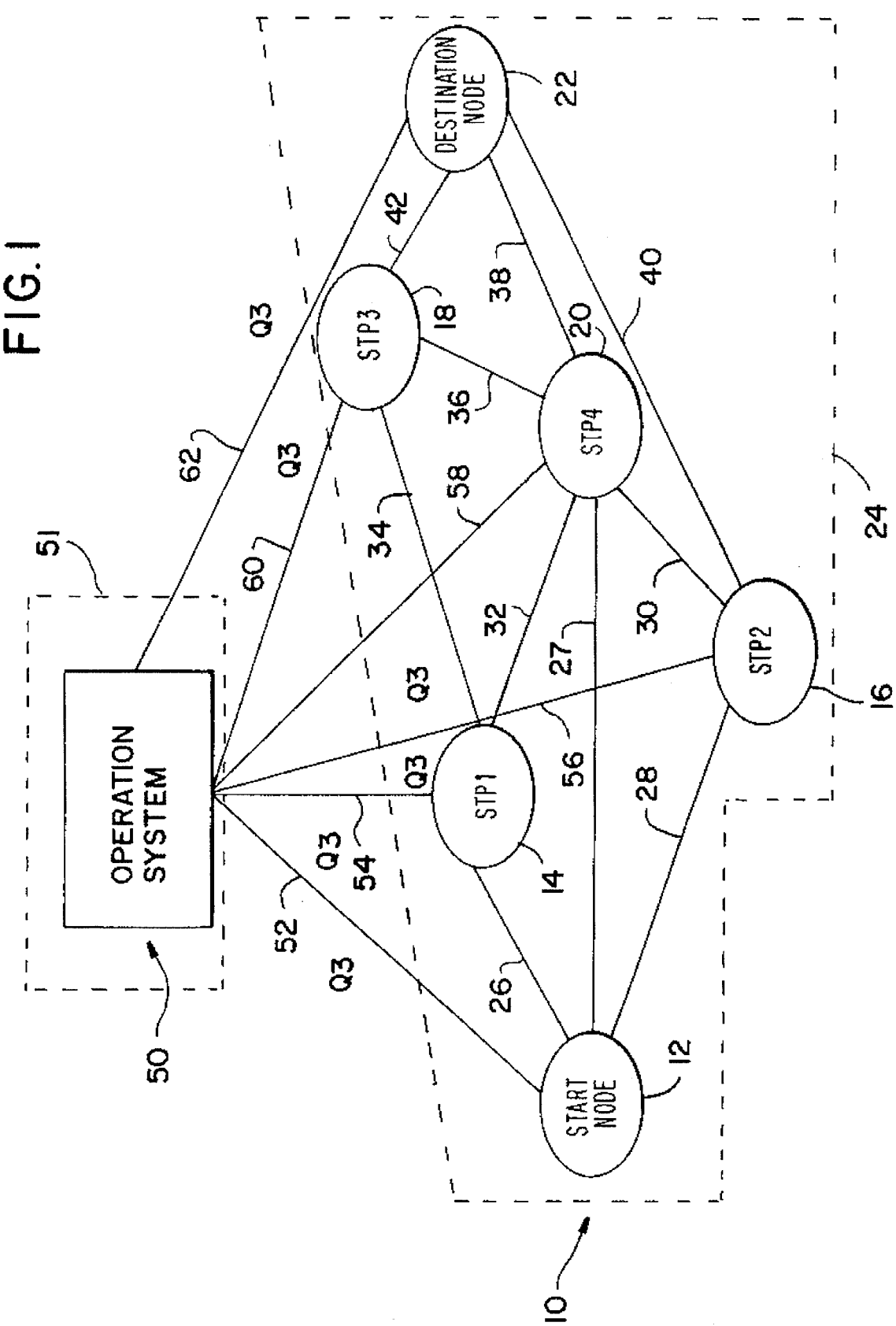
FIG. 1 illustrates the interrelationship between the telecommunications management network and the switching network of the present invention.

Referring to FIG. 1 there is shown a switching network within the broken lines 10. Switching network 10 includes 6 switching nodes or signalling transfer points labeled 12, 14, 16, 18, 20, and 22. The illustrated network has been drawn to illustrate a start or initiation node 12, a destination node 22 and intermediate nodes 14, 16, 18, and 20. It should be understood that for the purpose of this description, the start node 12 and the destination node 22 may be intermediate nodes in other signal transfers, but have been so designated for the purpose of measuring the loading effect on the network 10 that is the direct result of running a routing verification test.

The switching network of the preferred embodiment of the present invention shown within broken line 24 is a CCITT SS7 network. Each of the nodes 12 through 22 respectively shown within the network includes a routing table associated therewith for routing a signal along one or more link sets to a subsequent node in the routing of the signal within the network. The routing table information is both static and partial path. The link sets between the nodes are shown by link set connection 26 between nodes 12 and 14, link set 27 between nodes 12 and 20, link set 28 between nodes 12 and 16, link set 30 between nodes 16 and 20, link set 32 between nodes 14 and 20, link set 34 between nodes 14 and 18, link set 36 between nodes 18 and 20, link set 38 between nodes 20 and 22, link set 40 between nodes 16 and 22, and link set 42 between nodes 18 and 22.

Referring to FIG. 2 there is shown an example of the routing table information for each of the nodes 12 through 20. In the middle column of Table 1, the primary link set is defined as the preferred or primary route along which a message or a signal is transferred from the node defined in the left most column. The right most column indicates alternative link sets along which a signal will pass or travel in the event the primary path is either disabled, busy, or out of service. Accordingly, a message at node 12 will be sent primarily along link set 27 to node 20. In the event a message cannot be sent along link set 27, node 12 will switch the message to send it either along link set 26 to node 14 or link set 28 to node 16. Likewise, node 14 will primarily send its message over link 32 to node 20 however, in the event that node link 32 is busy or not able to function, node 14 will route its message along link 34 to node 18. Node 16 has primary route along link set 40 to node 22. In the event that the signal cannot travel along link set 40, node 60 will direct its message along link set 30 to node 20. Node 18 has a primary message routing along link set 42 to node 22 and a secondary or alternate path along link set 36 to node 20. Node 20 has a primary route along link set 38 to node 22. In this example, node 20 has no alternative link set route.

With this routing information table in FIG. 2, a message initiated at node 12 having a destination of node 22 may follow a route to the destination node through several different switching nodes depending on the channels that are open for communicating the messages between the nodes.

Figure 3:
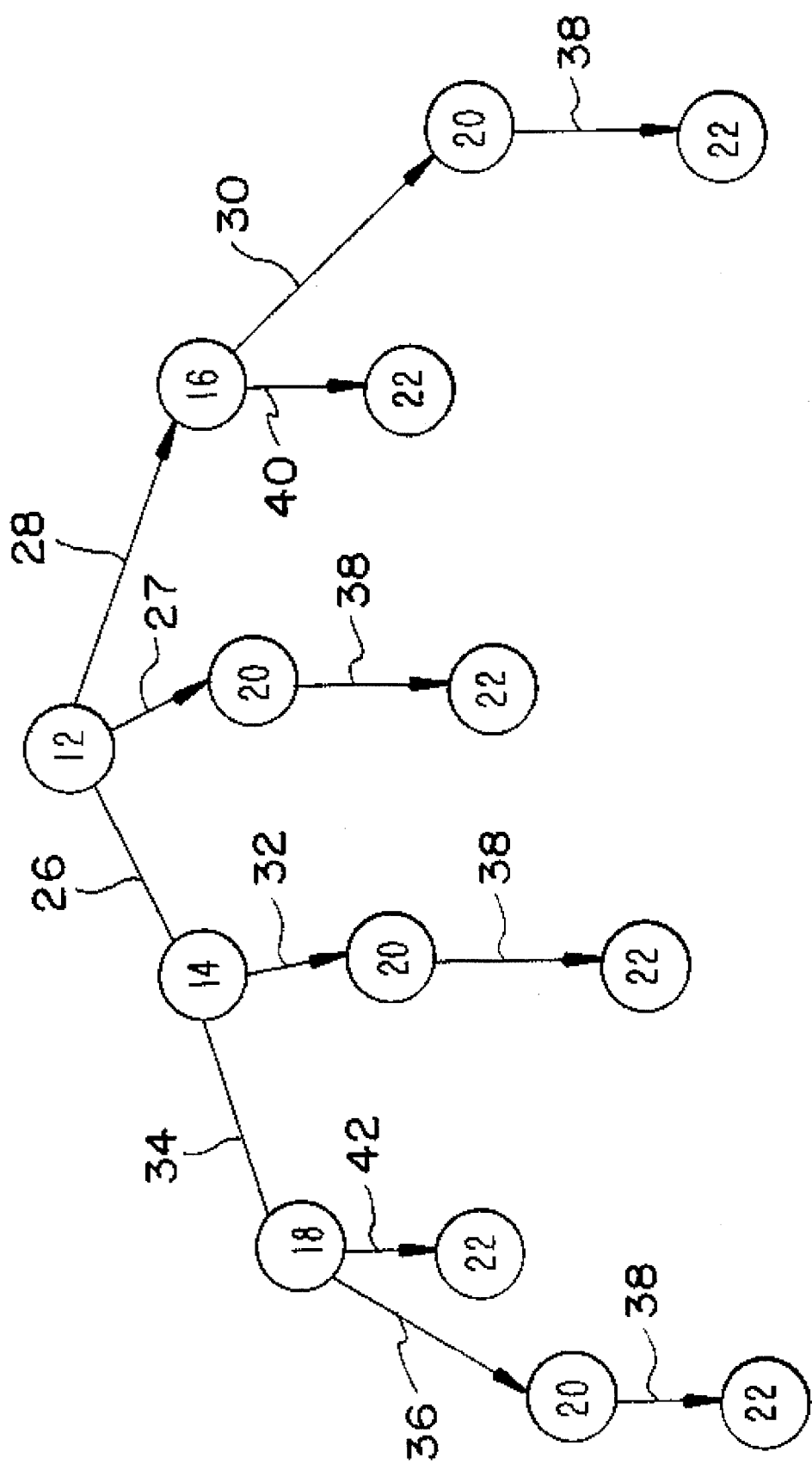
FIG. 3 illustrates the message tree for the switching network of FIG. 1 and routing table of FIG. 2.

Referring to FIG. 3 there is shown a message tree for the SS7 network portion of FIG. 1 and the routing table of FIG. 2. From the message tree of FIG. 3, it can be seen that there are potentially 6 working paths through different nodes that the message can follow to get to the destination node 22 from the initiation or the starting node 12. The primary route for a message to travel from start node 12 to destination node 22 is (from FIG. 2) along link set 27 to node 20. Once the message is at switching node 20, switching node 20 would direct the message along link set 38 to destination node 22. In the event these channels or link sets are not open, then an alternative route would be determined to the destination node 22 from the start node 12 through which a communication channel would be set up for transferring the message.

Referring back to FIG. 1 there is shown at 50 an operation system. The operation system forms part of the telecommunication management network shown diagrammatically within broken lines 51. The operation system is connected through a general purpose interface which has been referred to as a "Q3" interface. These Q3 interfaces have been defined in CCITT recommendation M.3100. Each interface is connected to a respective node in the SS7 switching network. The interface from the operation system 50 to node 12 is labeled 52, to node 14 is labeled 54, to node 16 is labeled 56, to node 20 is labeled 58, to node 18 is labeled 60, and to node 22 is labeled 62.

It should be understood that the operation system is part of the telecommunications management network hierarchy that runs various controls on the network to insure that the network is operating properly and to control the operation of the actual signaling system of the network. The operation system is able to audit routing data off-line.

The operation system 51 generates routing message trees between a source node and a destination node preselected by an operator. The operating system then counts the number of branch arcs in the message tree and doubles this number to reflect the messages transmitted and acknowledged across each branch arc. In the example of FIG. 3, there are 13 branch arcs that translates into 26 transmit and receive messages. There are also 6 destination node receive confirmation messages. Thus the total loading on the network would be 26+6=32 messages. The operation system then sends a signal to the operator as an indication of the number of messages that will be generated by the test. The operator is then in a position to determine whether or not to run the test at this time or schedule the test for a later time.

Figure 4:
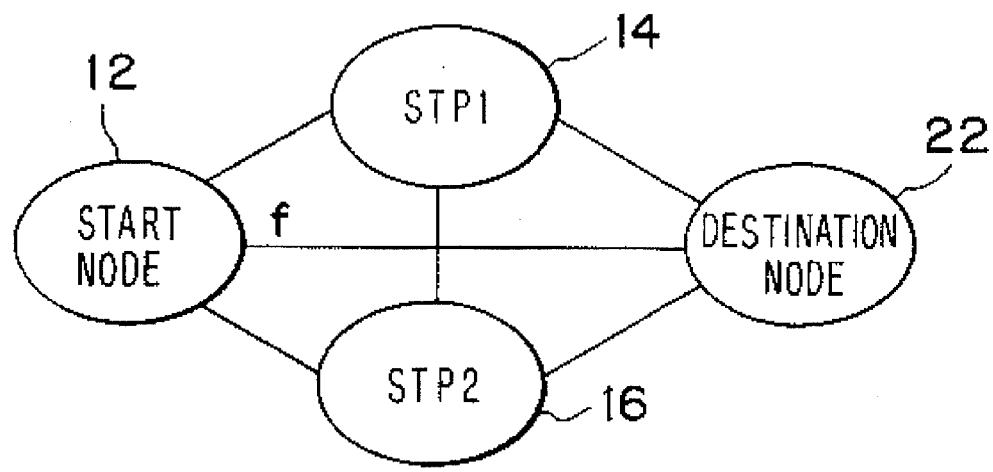
FIG. 4 illustrates the interrelationship between another nodal relationship of nodes in a switching network of the present invention

Referring to FIG. 4, there is shown a switching network including four switching nodes similar to those shown in FIG. 1. In this embodiment however, between STP1 and STP2, nodes 14 and 16 respectively is a connection indicating a mated pair. Further, there is shown an F link between node 12 and destination node 22. For the sake of simplicity, the operating system 50 and the Q3 interface links have not been shown. It should be understood however that these links would be present and would permit the operating system to continually monitor the switching within the nodes.

Figure 5:
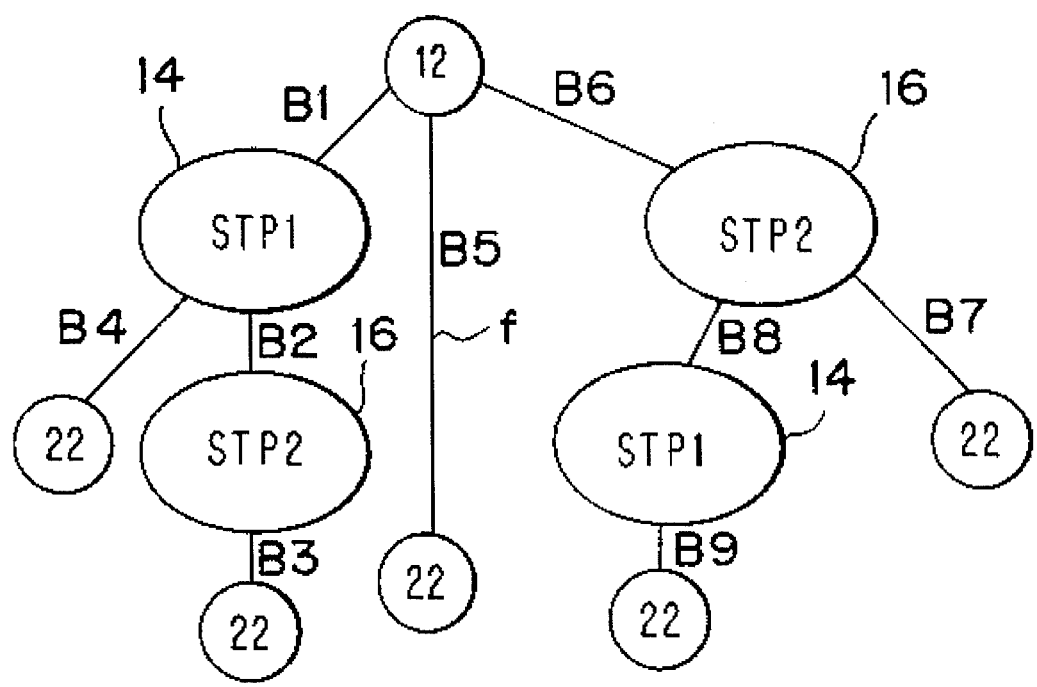
FIG. 5 illustrates the message tree for the switching network of FIG. 4.

Referring to FIG. 5 there is shown a message tree for the network shown in FIG. 4. Within the scope of the invention it is envisaged that the operator would at one time or another indicate that the operator would like to know how many messages would be required in a verification test of the tables between source node 12 and destination node 22 in FIG. 4. This would result in the operating system conducting an audit of the nodes 12, 14, 16, and 22 in FIG. 4. While a routing table is not shown for the nodes of this Figure, it is assumed that a routing tables would exist that are similar to that shown in FIG. 2. Assume that the message tree in FIG. 5 represents the message tree for the nodes of FIG. 4, it can be seen that there 5 received messages at the destination node. Further the branches have been identified by the letters B1 through B9.

Using the formula of the prior art disclosed in the aforementioned Bell Core reference, with their being one mated pair of nodes (STP1 and STP2). This formula would give $2^{2(1)}$ which would equal 4 destination received messages. It can be seen however that there are 5 destination received messages because of the direct "F" link branch B5. Thus, the formula of the prior art does not take into consideration the F links or direct links from a mating node to a destination node. Further, it can now be seen that there are 9 branches. In the communication of messages between nodes there is a transfer part of a message and an acknowledgment part of a message for each branch. Accordingly, there would be 18 messages transferred. In addition there would be 5 messages received giving a total of 23 messages generated by a test of the tables between the source node 12 and the destination node 22 of FIG. 4.

Figure 6:
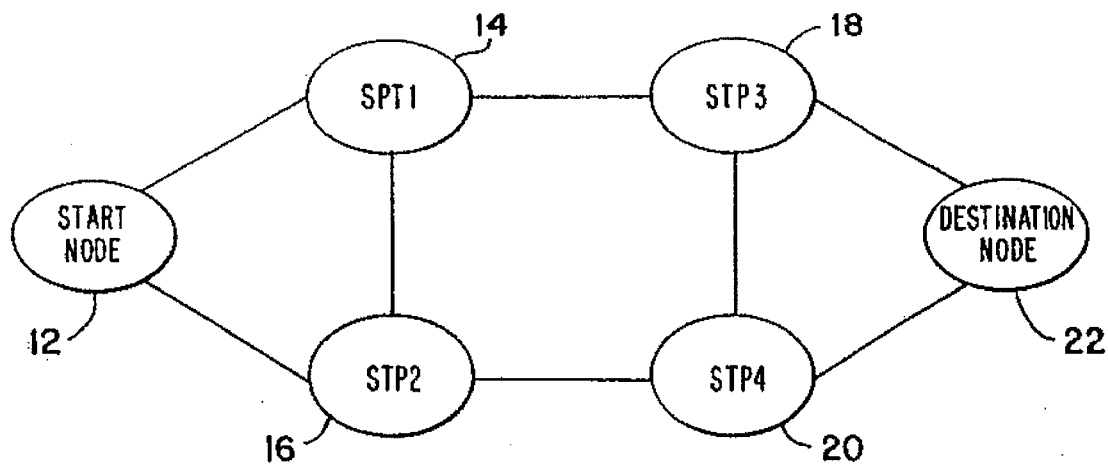
FIG. 6, illustrates the interrelationship between another nodal relationship of nodes in a switching network of the present invention; and, FIG. 7, illustrates the message tree for the switching network of FIG. 6.

Referring to FIG. 6, there is shown a similar node network topography as in FIG. 4, however, there is also a mating pair between nodes SPT3(18) and SPT4(20).

Figure 7:
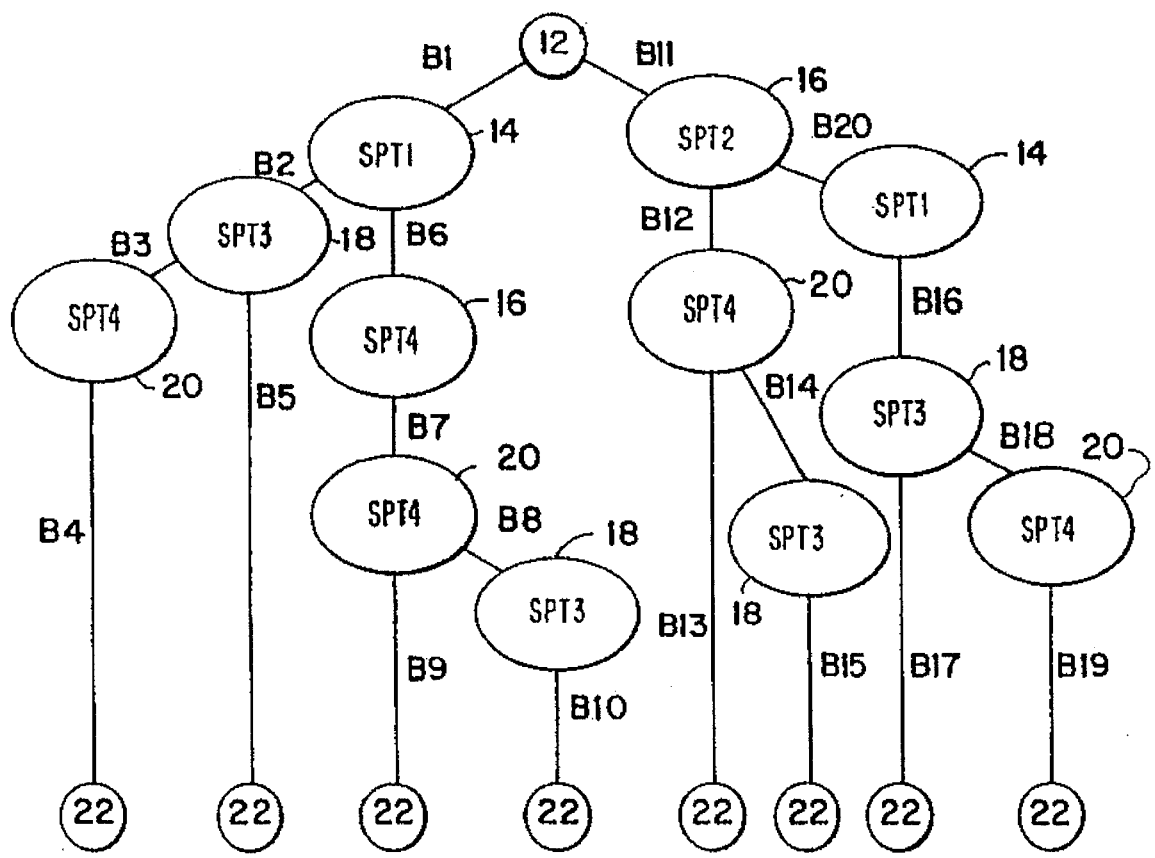

Referring to FIG. 7, there is illustrated the message tree that results the switching of a message if a test was run by the operator from source node 12 to destination node 22. Again referring to the previous Bell Core prior art method for determining the loading of a network, this formula would give $2^{2(n)}$ where n=2 mating nodes. This would equal 24 which would equal 16 destination nodes signals being received. Because there are no F links between any of the mating nodes SPT1 and SPT2 and the destination of 22, the formula is correct for the number of destination messages. However, the formula does not assist in breaking down the total number of messages. From the message tree it can be seen that there are 20 branches associated with this test. Since each branch will require a transfer message part and an acknowledge message part this means there would be 40 messages sent just in the transference and acknowledgment of the branches. In addition, there would be 8 messages received that the destination nodes. Consequently the overall message loading impact would be 48 messages for this nodal system arrangement.

In accordance with the present invention, the operation system 50 would calculate the number of messages from these message tree of FIG. 7 and provide this information of 48 messages back to the operator.

It should be understood that the message trees and networks illustrated in FIGS. 1 through 7 are relatively simple in nature. There may be as many as 20 nodes involved in the transference of a signal from a source node to a destination node. Clearly the number of messages generated can be substantially larger than the 48 messages derived from FIG. 7. Thus, it is important for the operator to know the loading induced by running a verification test. This would allow the operator to schedule the test for non peak periods of time in the event the loading is significant.

It should be further understood that while the preferred embodiment relates to CCITT SS7 networks, the present invention is applicable to all SS7 networks and may have applications in other packet switched networks.

I claim:

1. A method for determining the "on line" load induced by a routing verification test on a packet switching network comprising a plurality of packet switching nodes and a plurality of bi-directional links each interconnecting a distinct pair of said nodes, the packet switching network having associated therewith a telecommunications management network comprising an operation system connected to each of said nodes through respective interfacing links, said method comprising the steps of:

collecting live routing data between an operator defined source node and an operator defined destination node;

transferring collected routing data from each of the sampled nodes through the respective interfacing link to the operation system;

generating a message tree corresponding to the collected routing data in the operation system to determine the total number of messages transmitted, acknowledged and received between the defined source and destinations nodes; and generating a signal to the operator representative of the total number of messages induced on the network.

2. The method of claim 1 wherein the generating a signal step further includes the steps of:

determining the number of branches in time message tree between the source node and the destination node and doubling this number to represent a total number of branch messages to be transmitted and acknowledged during a verification test between the source node and destination node, and adding to the total number of branch messages a number of received confirmation messages generated by the destination node to provide a number representative of the total number of messages induced on the network.

3. The method according to claim 1 wherein the collected routing data includes link sets between sampled nodes in the switching network.

4. The method of claim 1 wherein the step of transferring sampled routing data from the sampled node to the operation system utilizes a Q3 general purpose management interface.

5. The method of claim 1 wherein the operation system initiates an on line audit verification test when the total number of messages generated by such a test is less than a predetermined number of messages defined by the operator.

6. A method for determining the "on line" load induced by a routing verification test comprising one of a message transfer part routing verification test and a signalling connection control part routing verification test on a packet switching network comprising a plurality of packet switching nodes and a plurality of bi-directional links each interconnecting a distinct pair of said nodes, the packet switching network having associated therewith a telecommunications management network comprising an operation system connected to each of said nodes through respective interfacing links, said method comprising the steps of the operation system responsive to the operator providing test source node and destination node information;

collecting live routing data of link sets of sampled nodes between the test source and destination nodes in the switching network;

transferring collected routing data from each of the sampled nodes through the respective interfacing link to the operation system;

generating a message tree corresponding to the collected routing data in the operation system between the test source node and the test destination node through all intermediate nodes to determine the total number of messages transmitted, acknowledged and received between the defined test source and destinations nodes; and generating a signal to the operator representative of the total number of messages induced on the network.

7. The method of claim 6 wherein the generating a signal step further includes the steps of:

determining the number of branches in the message tree between the source node and the destination node and doubling this number to represent a total number of branch messages to be transmitted and acknowledged during a verification test between the source node and destination node, and adding to the total number of branch messages a number of received confirmation messages generated by the destination node to provide a number representative of the total number of messages induced on the network.

8. The method of claim 6 wherein the step of transferring sampled routing data from the sampled node to the operation system utilizes a Q3 general purpose management interface.

9. The method of claim 6 wherein the operation system initiates an on line audit verification test when the total number of messages generated by such a test is less than a predetermined number of messages defined by the operator.

10. A system for determining the "on line" load induced by a routing verification test on a packet switching network comprising a plurality of packet switching nodes and a plurality of bi-directional links each interconnecting a distinct pair of said nodes, the packet switching network having associated therewith a telecommunications management network, the system including:

an operation system functioning independently and remotely of the packet switching network and forming part of the telecommunications management network;

interfacing links connected between the operation system and respective ones of the switching nodes for sampling routing table data information at that node; and, the operation system collecting live routing data of link sets between nodes for sampled nodes in the switching network; transferring collected routing data from each of the sampled nodes through the respective interfacing link to the operation system; generating a message tree corresponding to the collected routing data in the operation system between an operator defined source node to an operator defined destination node through all intermediate nodes to determine the total number of messages transmitted, acknowledged and received between the defined source and destinations nodes; and, generating a signal to the operator representative of the total number of messages induced on the network.

11. The system of claim 10 wherein the operation system determines the number of branches in the message tree between the source node and the destination node and doubles this number to represent a total number of branch messages to be transmitted and acknowledged during a verification test between the source node and destination node, and the operation system adds to the total number of branch messages transmitted and acknowledged a number of received confirmation messages generated by the destination node to provide the total number of messages induced on the network.

12. The system of claim 10 wherein the interfacing links comprise Q3 general purpose management interface.

13. The system of claim 10 wherein the operation system initiates an on line audit verification test when the total number of messages generated by such a test is less than a predetermined number of messages defined by the operator.

14. A system for determining the "on line" load induced by a routing verification test comprising one of a message transfer part routing verification test and a signaling connection control part routing verification test on a packet switching network comprising a plurality of packet switching nodes and a plurality of bi-directional links each interconnecting a distinct pair of said nodes, the packet switching network having associated therewith a telecommunications management network comprising an operation system connected to each of said nodes through respective interfacing links, the system including:

an operation system functioning independently and remotely of the packet switching network and forming part of the telecommunications management network;

interfacing links connected between the operation system and respective ones of the switching nodes for sampling routing table data information at that node; and, the operation system, responsive to operator information as the a source node and a destination node, collecting live routing data of link sets of sampled nodes between the test source and destination nodes in the switching network; transferring collected routing data from each of the sampled nodes through the respective interfacing link to the operation system; generating a message tree corresponding to the collected routing data in the operation system between an operator defined source node to an operator defined destination node through all intermediate nodes to determine the total number of messages transmitted, acknowledged and received between the defined source and destinations nodes; and, generating a signal to the operator representative of the total number of messages induced on the network.

15. The system of claim 14 wherein the operation system determines the number of branches in the message tree between the source node and the destination node and doubles this number to represent a total number of branch messages to be transmitted and acknowledged during a verification test between the source node and destination node, and adds to the total number of branch messages transmitted and acknowledged a number of received confirmation messages generated by the destination node to provide a number representative of the total number of messages induced on the network.

16. The system of claim 14 wherein the interfacing links comprise a Q3 general purpose management interface.

17. The system of claim 14 wherein the operation system initiates an on line audit verification test when the total number of messages generated by such a test is less than a predetermined number of messages defined by the operator.

* * * * *